A. G. BOWEN.
VEHICLE STEERING MECHANISM.
APPLICATION FILED SEPT. 9, 1909.
1,120,016.
Patented Dec. 8, 1914.
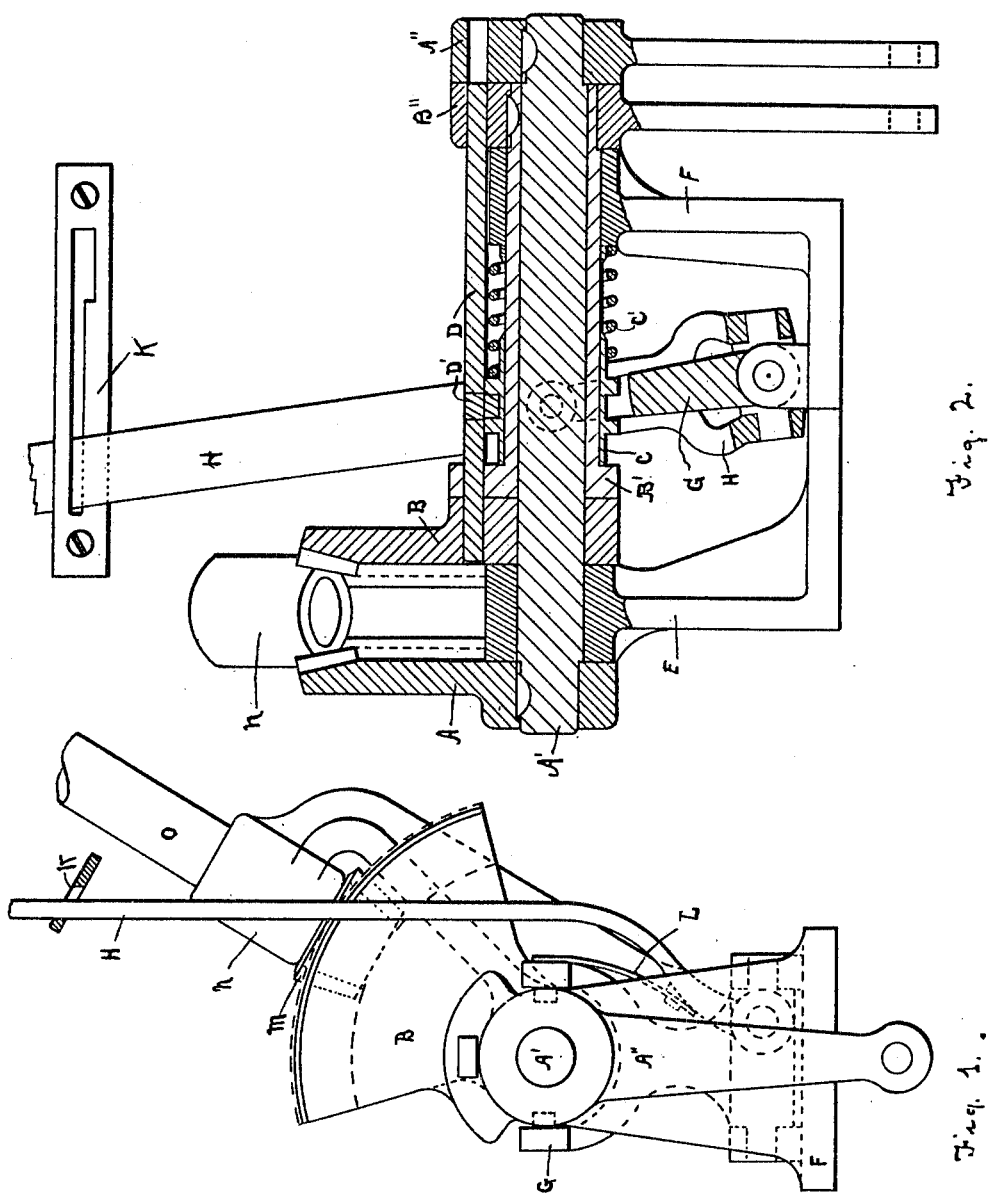

UNITED STATES PATENT OFFICE.

ADNA G. BOWEN, OF MEDINA, NEW YORK.

VEHICLE STEERING MECHANISM.

1,120,016.  Specification of Letters Patent.  Patented Dec. 8, 1914.

Application filed September 9, 1909. Serial No. 516,946.

*To all whom it may concern:*

Be it known that I, ADNA G. BOWEN, a citizen of the United States, residing in the village of Medina, in the county of Orleans and State of New York, have invented a certain new and useful Improvement in Vehicle Steering Mechanism; and I do hereby declare the following to be a full, clear, and exact description of the invention, such as will enable others skilled in the art to which it appertains to make and use the same.

My invention relates to that class of vehicle steering mechanisms in which both the front and rear wheels are controlled by the steering mechanism.

By means of my improved mechanism one is able to steer the vehicle either forward or backward, in a straight line, obliquely, or circling, with ease and confidence.

The invention is illustrated in the drawing.

Figure 1 is an end elevation. Fig. 2 is a front elevation principally in axial section.

As will be seen by referring to the drawing, the sector A and the steering arm A″ are rigidly secured to the solid arbor A′. The sector B is loose on the solid arbor A′. The steering arm B″ is rigidly secured to the hollow arbor B′. The solid arbor A′ lies within the hollow arbor B′ and projects at either end thereof. The loose collar C encircles the hollow arbor B′ and normally lies against a shoulder thereof, being held in contact therewith by the spiral spring C′. The sector B, the shoulder on the hollow arbor B′, the steering arm B″ and the steering arm A″, are slotted, so that when the said sectors and steering arms are parallel, a bolt D, carrying the pin D′, projecting into the groove in the loose collar C, can be moved freely back and forth, either into engagement with the sector B or the steering arm A″; the slot in the shoulder of the hollow arbor B′ and the steering arm B″ serving to guide said bolt and hold the same in constant rotative engagement with the hollow arbor B′.

The obvious purpose of the bearings E, F, N, is to hold the several parts in proper relation to each other and to the vehicle.

The lever G—H is for the purpose of throwing the bolt D by actuating the loose collar C, causing the bolt to slide back and forth in the slotted or recessed parts hereinbefore mentioned. This lever preferably consists of two parts; the part G, containing pins projecting into the aforesaid groove in the loose collar C, and hinged to the base of the mechanism at right angles to the axial line of the arbors; and the part H, hinged to the part G, so that it may have a slight forward and back motion for the purpose of holding it in the depression in the plate K, through the action of the spring L. The plate K is for the purpose of limiting the movement of the lever G—H and retaining it in such position as may be required.

The spring L, interposed between the parts G and H is for the purpose of pressing the part H against the lower edge of the slot in the plate K, so that when the same is moved to a depression therein, the same will remain as placed until released.

Between the sectors A and B, and in mesh therewith, is interposed the pinion M, rigidly secured to the steering post O, in the bearing N, for the purpose of actuating said sectors.

The position of the mechanism in the drawing as shown I term its normal position. In this position the vehicle can be steered either forward or backward in a straight line or circling. Its other position results from throwing the lever to the other end of the slot in the plate K. In this position the vehicle can be steered either forward or backward in a straight line or obliquely. Then, when the wheels are parallel with the longitudinal axis of the vehicle, the mechanism will resume its normal position through the action of the spiral spring C′ upon pushing the part H forward so as to release same from the depression in the plate K.

The operation of the mechanism above described is as follows: Upon rotating the steering post O, the pinion M actuates the sectors A and B in opposite directions. Now if the lever G—H is in the position shown in Fig. 2, its normal position, it is seen that the arbors A′ and B′ will likewise rotate in opposite directions so that the steering arm controlling the front wheels will move them in one direction, while the steering arm controlling the rear wheels will move them in the opposite direction, causing the vehicle to describe a circle. If on the other hand the lever G—H be thrown over to the other end of the slot in the plate K and held there, the bolt D will be withdrawn from the sector B and will lock the steering arms A″ and B″ together so that they will move in unison thereby causing the front and rear wheels of the moving vehicle to assume the same direction, whereupon the vehicle will move obliquely.

In this mechanism it will be seen that the bolt D can be thrown from one position to the other only when all the slots through which it passes are parallel; and this can occur only when the wheels are parallel with the longitudinal axis of the vehicle.

The expression "solid arbor" is used herein to differentiate the same from the "hollow arbor", and is not intended to mean that the same must be solid in fact.

Therefore, what I claim is:

1. In a steering mechanism for vehicles, the combination with the concentric arbors, sectors rigidly and loosely mounted respectively on the inner arbor and a steering arm rigidly mounted on each arbor, of a steering post operatively connected with the sectors for oscillating them in opposite directions, and means for locking the loose sector and outer arbor together, whereby the arbors are simultaneously oscillated in opposite directions, or for locking the arbors together for simultaneous oscillation in the same direction when the outer arbor and loose sector are disconnected.

2. In a steering mechanism for vehicles, the combination with concentric arbors, fast and loose sectors mounted on the inner arbor and steering arms rigidly mounted on the arbors, of a steering post operatively connected with the sectors for oscillating them in opposite directions, a bolt carried by the outer arbor and movable longitudinally for locking said arbor and loose sector together, or for locking the inner and outer arbors together, a spring for holding said bolt advanced in one direction, and an operating lever for moving the bolt against the tension of said spring.

3. In a steering mechanism for vehicles, the combination with concentric arbors, a steering arm rigidly mounted on each arbor, a gear sector fast on one arbor, and a loose gear sector, of a steering post in operative engagement with said sectors for oscillating them in opposite directions simultaneously, and a locking mechanism movable in one direction to lock the loose sector and one of the arbors together and movable in the opposite direction for locking the arbors for simultaneous movement in the same direction, substantially as described.

4. In a steering mechanism for vehicles, the combination with the concentric arbors, a steering arm rigidly mounted on each arbor and a single steering post, of means interposed between said steering post and arbors for oscillating said arbors through less than 180° to effect the steering of the vehicle, means for disconnecting the operative connection between one of the arbors and steering post, and a sliding bolt for locking the arbors together for oscillation simultaneously in the same direction.

5. A vehicle steering mechanism comprising two steering arms rigidly secured to arbors rotating on the same axis, sectors on said arbors, a pinion in mesh with said sectors, a steering post in actuating engagement therewith for causing said pinion to rotate said sectors in opposite directions, means for utilizing the motion of said sectors to rotate said arbors in unison or in opposition less than 180 degrees to effect the steering of the vehicle.

6. A vehicle steering mechanism comprising a tight steering arm on a hollow arbor, a tight steering arm on a solid arbor within said hollow arbor, tight and loose sectors on said solid arbor, a steering post, a pinion thereon in mesh with said sectors, a bolt longitudinally disposed on said hollow arbor, a recess for the admission of said bolt in said loose sector and in the steering arm on said solid arbor, means for throwing said bolt into engagement with said loose sector or said solid arbor; whereby the rotation of said steering post will cause said steering arms to move in unison or in opposition less than 180 degrees to effect the steering of the vehicle.

7. A vehicle steering mechanism comprising a steering arm on a hollow arbor, a steering arm on a solid arbor within said hollow arbor, tight and loose sectors on said solid arbor, a steering post, a pinion thereon in mesh with said sectors, a bolt on said hollow arbor for locking the loose sector thereto, a loose collar on said hollow arbor in actuating engagement with said bolt, a lever in actuating engagement with said collar, a spring lying against said collar for holding the bolt at one extreme of its movement, a spring lying against said lever and so located as to keep the same pressed against one side of the slot in a retaining plate, a retaining plate to limit the movement of said lever; whereby, upon the rotation of said steering post said steering arms will move in unison or in opposition less than 180 degrees to effect the steering of the vehicle, depending upon the position of said lever.

8. A vehicle steering mechanism comprising a hollow arbor having a steering arm rigidly secured to the outer end thereof, a solid arbor lying within said hollow arbor and having a steering arm rigidly secured to the outer end thereof adjacent to the steering arm on the hollow arbor, a sector loose on said solid arbor adjacent to the inner end of said hollow arbor, a sector rigidly secured to the inner end of said solid arbor, a steering post, a pinion thereon in mesh with said sectors, a loose collar on said hollow arbor, a bolt longitudinally disposed on said hollow arbor and in actuating engagement with said collar, slots in said loose sector, hollow arbor, and steering arms for the passage of said bolt, a lever in actuating engagement with said collar by which the said bolt can be thrown so as to interlock said loose sector with said hollow arbor or said hollow arbor with said steering arms, a retaining plate to limit the movement of said lever, a spring so located as to keep said collar normally against a shoulder on said hollow arbor, a spring so located on said lever as to keep the same pressed against one side of the slot in said retaining plate; whereby, upon the rotation of the said steering post, said steering arms will be moved in unison or in opposition less than 180 degrees to effect the steering of the vehicle, depending upon the position of said lever.

ADNA G. BOWEN.

Witnesses:
ABIEL BOWEN,
HELEN C. BOWEN.

Copies of this patent may be obtained for five cents each, by addressing the "Commissioner of Patents, Washington, D. C."